INVENTORS.
JOHN G. SIMMONS
DOUGLAS E. MOISTER JR.
DAVID A. STARR JR.

AGENT

INVENTORS.
JOHN G. SIMMONS
DOUGLAS E. MOISTER JR.
DAVID A. STARR JR.

AGENT

Fig.19

United States Patent Office
3,336,898
Patented Aug. 22, 1967

3,336,898
VAPOR DEPOSITION APPARATUS
John G. Simmons, Norristown, Douglas E. Moister, Jr., Conshohocken, and David A. Starr, Jr., Paoli, Pa., assignors to Burroughs Corporation, Detroit, Mich., a corporation of Michigan
Filed Nov. 16, 1962, Ser. No. 238,165
7 Claims. (Cl. 118—49)

This invention relates to electronic circuit fabrication apparatus and more particularly, although not necessarily exclusively, to apparatus for evaporatively depositing thin metallic films on dielectric substrates. Still more specifically, the invention relates to apparatus for fabricating integrated thin film circuit devices such as diodes, triodes, etc., in vacua.

More particularly, the invention has to do with thin film evaporation deposition apparatus wherein a plurality of fabrication steps for the simultaneous production of multiple thin film devices are performed within a vacuum chamber and wherein each of such steps is accomplished without breaking the vacuum seal or physically handling any of the circuit components or assemblies.

In order to obtain completely acceptable reproducible results in vacuum deposition of complex multiple layer film structures for electronic and microelectronic circuits it is necessary to deposit the electrically conductive film or films in a high vacuum environment ($10^8$ torr) sequentially, without breaking the vacuum.

Since successive depositions are necessarily of different materials, several evaporation filaments or boat heaters must be used with each filament or heater requiring at least one high-current feed-through into the vacuum system. Every feed-through represents a potential high-vacuum leak, thus limiting the ultimate vacuum that can be obtained. Furthermore, because multiple heaters must be used, the materials cannot all be evaporated from the same point in the system; this geometrical dispersion gives rise to substrate surface inconsistencies caused by variations in the source-to-substrate angle of incidence.

It is an important object of this invention to solve this and other problems in a new and novel manner.

It is an important object of the present invention to provide an improved apparatus for condensing evaporated films of solid material, such as metals, onto dielectric substrate material, such for example, as glass.

Another object of the invention is the provision of evaporating apparatus for forming on a surface in vacuum extremely thin conductive material thereby to produce individual electrical circuit components as well as integrated electrical circuit arrangements.

A further object of the invention is the provision of a fully unitized vacuum apparatus for performing a plurality of independent evaporating-condensing steps in the production of thin film type circuit devices within a vacuum without breaking the vacuum and without contaminating previously evaporated devices.

In accordance with the foregoing objects and first briefly described, the invention comprises a multiple heater vacuum turret for vapor deposition of complex multi-layer thin electrically conductive structures on dielectric substrates for electronic and microelectronic circuits wherein a plurality of substrate holders are circularly arranged relative to a rotatable substrate mask holder and a rotatable filament or heater holder in a manner such that all materials can be evaporated onto the substrates at the same source-to-substrate angle from the same relative point in the system producing exact substrate surface consistency and eliminating all angle of incidence problems. The movable turrets, shields and other elements of the system are rotated by means of a magnetic feed-through eliminating the use of dynamic vacuum seals and utilizing a single high current feed-through.

Still other objects and advantages of the invention will become more apparent to those skilled in the art by reference to the following detailed description of the exemplary embodiments of the method and apparatus together with the appended claims. The various figures of the exemplary embodiment according to the invention may best be understood with reference to the accompanying drawings wherein:

Briefly, the present apparatus includes a transparent vacuum chamber in which is disposed a rotatable disc-like turret member which accommodates a plurality of heaters for retaining the conductive material which is to be evaporatively deposited. The turret is rotated by means of a magnetic feed-through from atmosphere into vacuum which eliminates the use of dynamic vacuum seals. Each heater can be rotated in its turn as desired to the center of the vacuum system from which point the material carried by the heater is evaporated, thus eliminating angle of incidence problems. Since only one high-current feed-through is used, high-vacuum problems are minimized. An integral diaphragm structure surrounding the current feed-through permits limited angular and lateral motion of the feed-through for making and breaking the high-current contact, as will be described in detail hereinafter.

Figure 1:
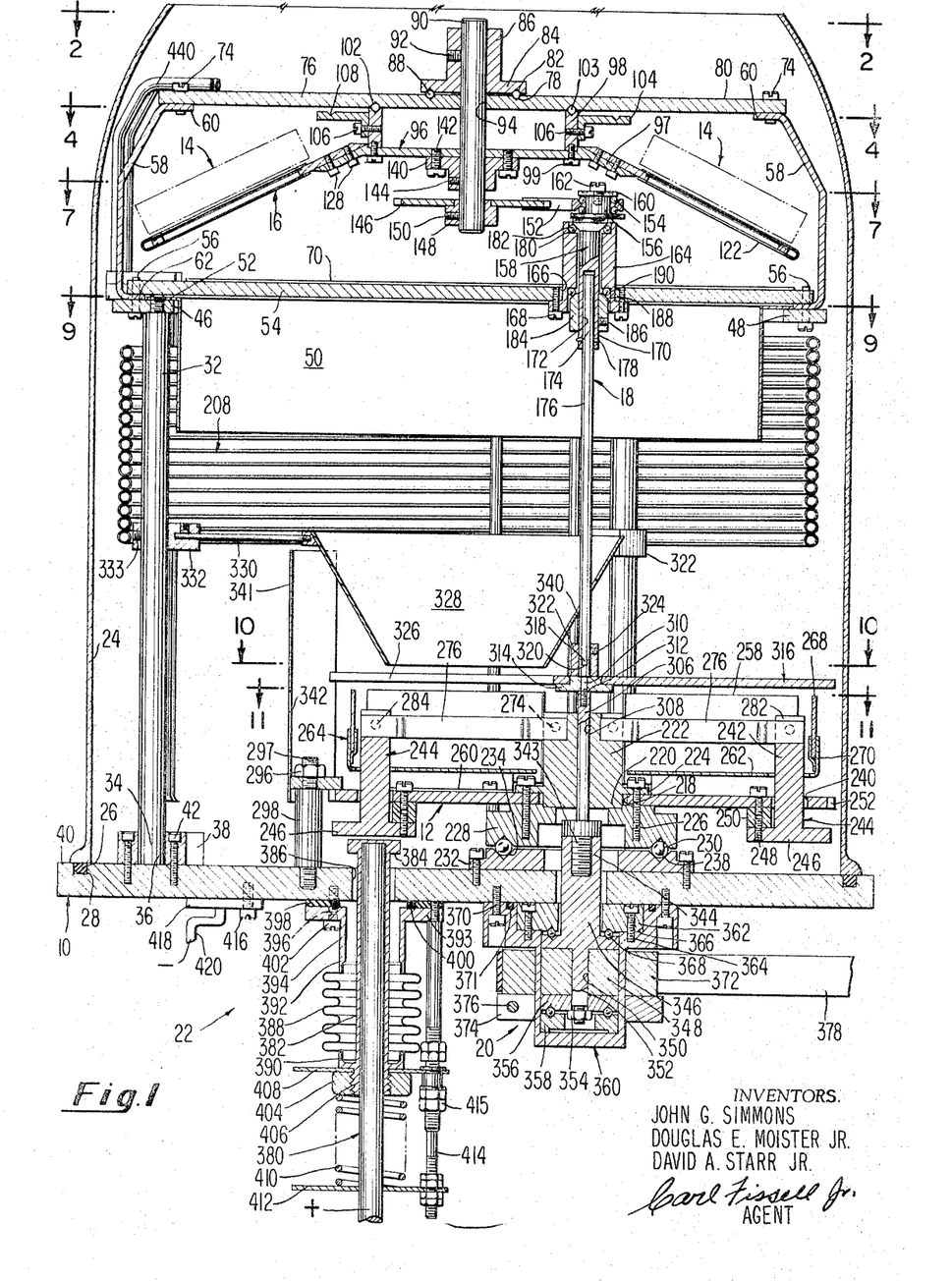
FIG. 1 is a sectional side elevational view along the line 1—1 of FIG. 2 illustrating a preferred embodiment of the present invention.
Figure 2:
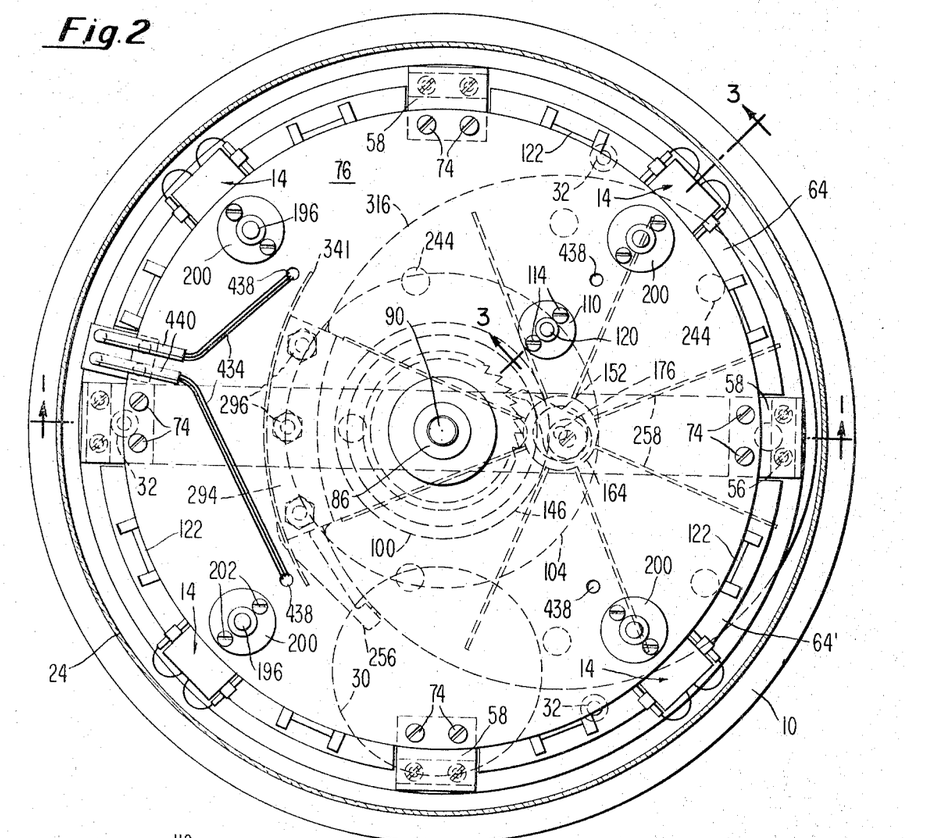
FIG. 2 is a top plan view of the present apparatus along the line 2—2 of FIG. 1.

Referring first to FIG. 1 of the drawings it is seen that the present apparatus comprises a number of separate subassemblies, each one of which is more or less independently operable or movable with respect to the others. These subassemblies are supported upon a rigid base 10 and are seen to include filament or boat heater turret 12, substrate holder 14, mask holder turret 16, drive control 18, magnetic drive 20 and electrically conductive feed-through apparatus 22 for energizing the filaments and/or boats of turret 12, as the case may be. Each of these subassemblies is demountably integrated with each of the others in a manner permitting the entire assembly to be housed within the confines of a transparent vacuum chamber which, in the present instance, is illustrated as a glass bell jar 24, adapted to be seated over a gasket 26 disposed in a circular groove 28 in base plate 10 of the apparatus. A vacuum orifice 30, FIG. 2, is provided, through which the atmosphere within the bell jar may be reduced by suitable means such as an oil diffusion vacuum pump or similar type apparatus, not shown herein.

Figure 9:
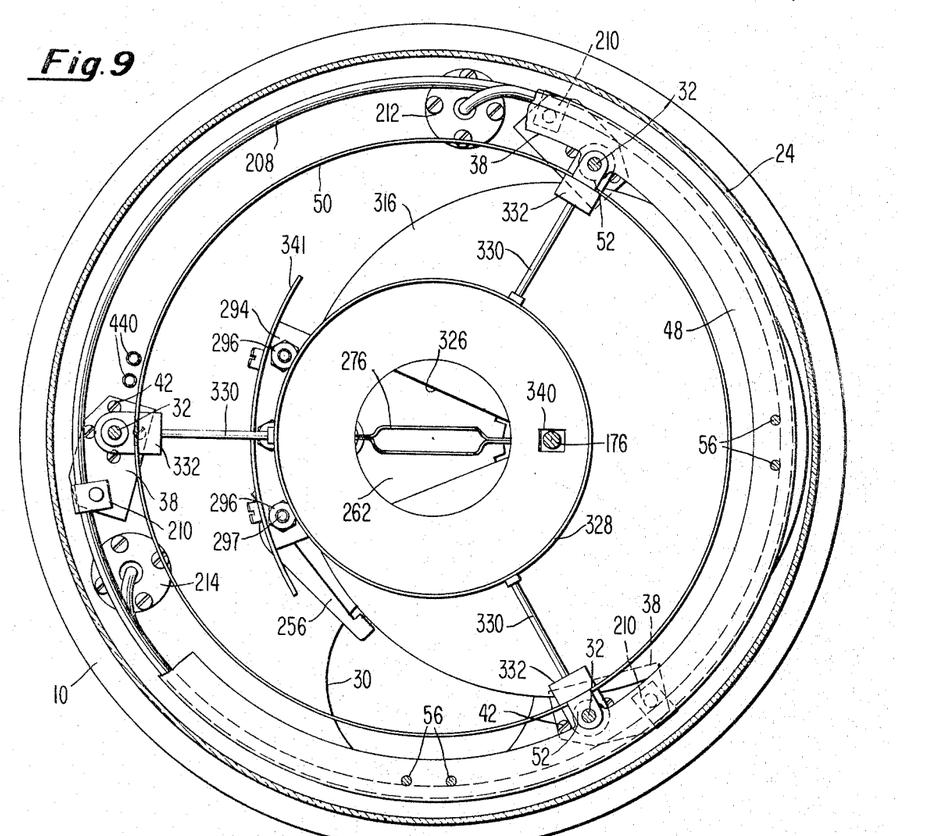
FIG. 9 is a sectional view along the line 9—9 of FIG. 1.

As seen most clearly in FIG. 9, three vertically disposed rods or shafts 32 support the central and upper portions of the apparatus seen in FIG. 1 the lower end 34 of each shaft 32, is received through the bore 36 of a rigid block 38, into abutting relation with the upper surface 40 of the base 10. Each block 38 is demountably secured to the base as by bolts 42.

The upper end 44 of each shaft 32 is provided with a reduced threaded shank 46 on which there is received a rigid circular ring 48. A circular baffle 50 of thin sheet metal e.g., stainless steel, is positioned between the shafts 32 and secured thereto by means of integral perforated tabs or tangs 52 extending therefrom which are received over the threaded shank 46, FIG. 1. A transverse rigid bar 54, FIGS. 1, 2 and 7, of metal or similar material extends diametrically across the apparatus and is positioned at opposite ends on ring 48 and is secured thereto by bolts 56 thereby to provide a bearing support for the upper end of control 18, as will be described in detail hereinafter.

Figure 7:
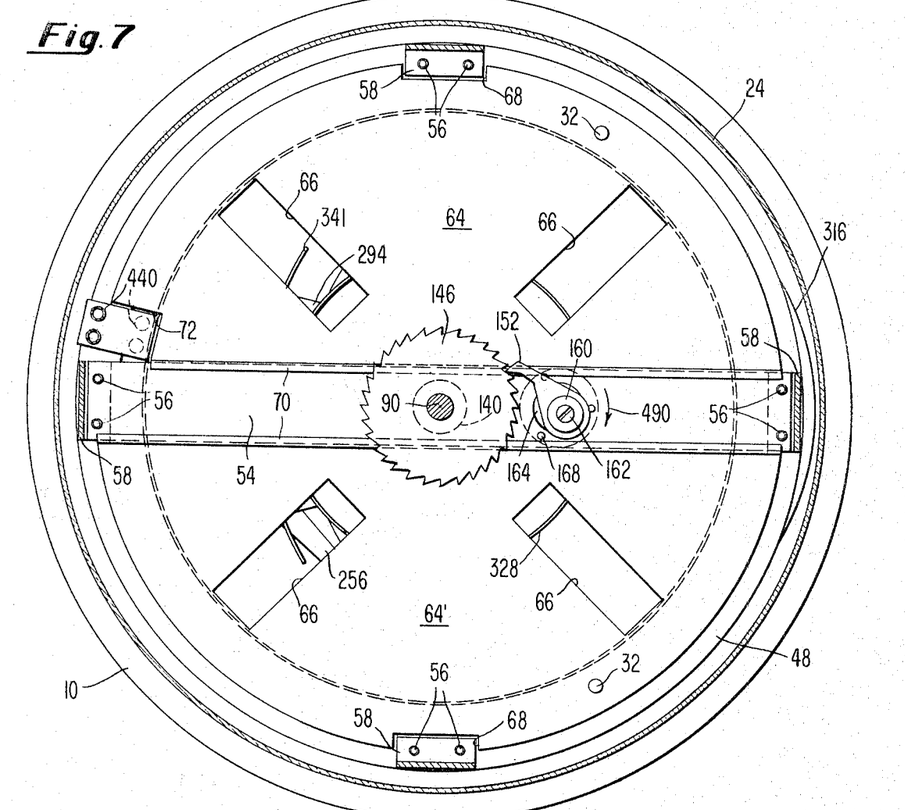
FIG. 7 is a view along the line 7—7 of FIG. 1.

Upstanding, irregularly shaped leg members 58, including upper and lower inwardly turned portions 60 and 62, respectively, are attached by means of the lower portions 62, to the ring 48 by the bolts 56. A pair of oppositely disposed fan shaped shield members 64–64', FIG. 7, each including a pair of angularly arranged rectangular openings 66 and oppositively disposed clearance cut outs or notches 68, are mounted on ring 48 with the bent flanges 70 of each member 46–46' in confronting relationship and overlapping the edges of the transverse bar 54, as seen in FIG. 7. An enlarged clearance notch 72 is provided in member 64, for purposes to be explained hereinafter.

Secured by bolts 74, FIG. 1, to the upper portions 60 of the leg members 58, is a rigid circular supporting disc or plate 76. A circular groove or channel 78 formed in the upper surface 80 of disc 76 provides one portion of a bearing race. The other portion of the race is provided by a groove 82 in flange 84 of upper bearing block 86. Steel balls 88 of a type unaffected by high heat provide bearings for this apparatus, which will now be described.

A short stub shaft 90 is secured to block 86 by means of a set screw 92 and projects vertically downwardly a short distance through a central aperture 94 in plate 76. As seen in detail in FIG. 3, an inverted cup-shaped member 96, provided with a flared edge portion 97, carries a bearing collar 98 secured thereto by bolts 99. The vertical edge 100 of member 98 has a groove 101 adjacent a groove 102 in the lower surface of plate 76 providing a bearing race for bearings 103. An annular flange member 104 is secured to collar 98 by means of bolts 106 which extend horizontally therethrough. The upper periphery of flange 104 is drilled, or dimpled in a circular pattern as indicated by reference character 108. A detent supporting member 110 having a partially threaded bore 112 is secured to plate 76 by means of bolts 114 and carries a ball bearing 115 biased against plate 104 by means of a spring 118, the latter being retained in the bore 112 by means of the screw 120. Rotation of disc 96 will cause the bearing 116 to ride up out of a dimple 108 and over the intervening surface of member 104 until it seats again in another depression 108 therein.

Figure 4:
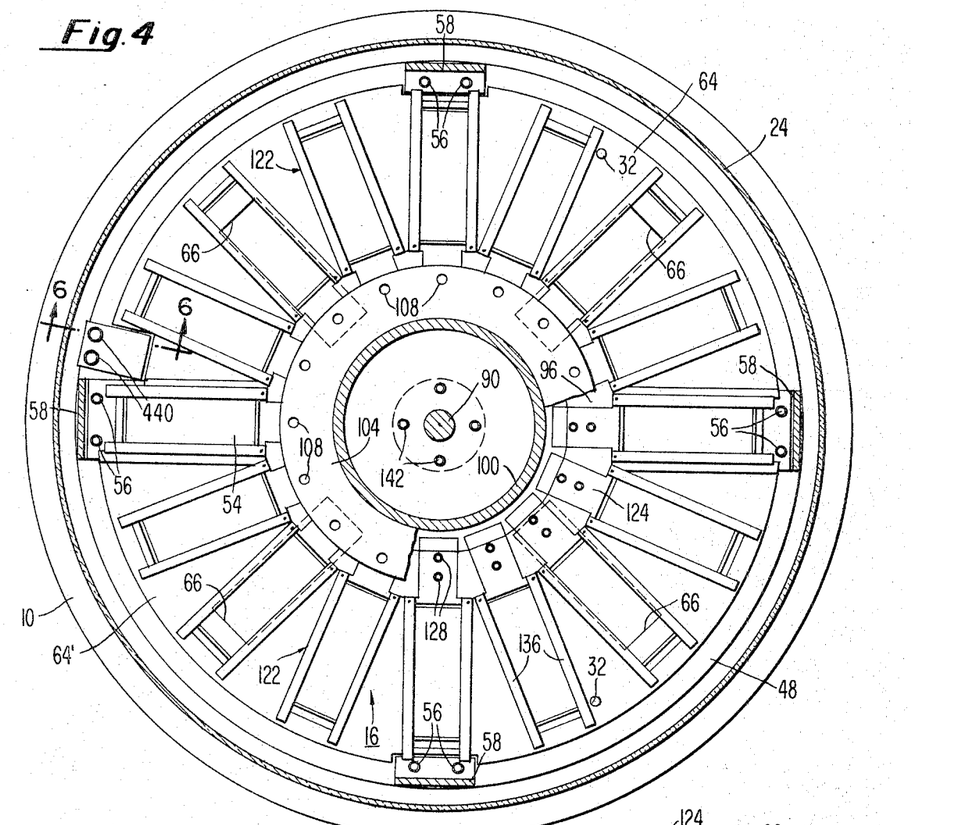
FIG. 4 is a sectional view along the line 4—4 of FIG. 1.
Figure 5:
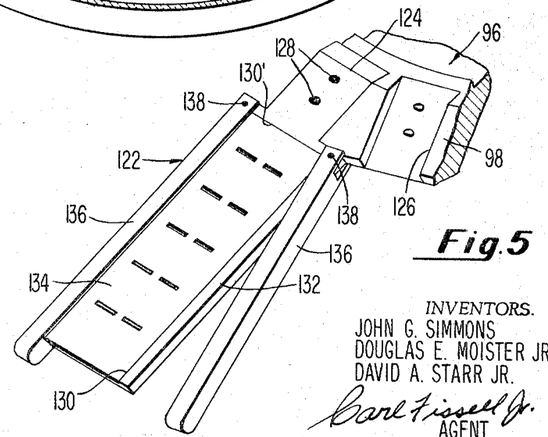
FIG. 5 is an isometric view of a substrate mask holder for use with the present invention.

Demountably attached in tongue and groove fashion, FIG. 5, to the downwardly canted or angled rim 97 of the disc-shaped member 96 are a plurality of spatula-like rectangular substrate mask holders 122, FIGS. 4 and 5. One end of each mask holder 122, is provided with a projecting tang or tongue 124 for securement by bolts 128 in a corresponding groove 126, opening in from the peripheral edge of disc 96. A ledge 130 provided along opposite parallel legs 132—132 of holder 122, together with a transverse ledge 130' across the top thereof permit each mask 134 to be slidably receivable on disc 96, as shown. Oppositely disposed parallel channel shaped wing-like closure members 136 pivoted at their ends 138 to respective right and left upper corners of each mask holder 122 enables a mask 134, FIG. 8, to be wedged therebetween and when in closed condition, FIG. 4, to maintain the masks substantially flat therein thereby forming the rotatable mask holder turret 16.

Disc 96 is mounted on stub shaft 90 for rotation therewith by means of a block 140, FIG. 1, which is attached to the disc 96 by bolts 142 and to shaft 90 by set screw 144. Adjacent block 140 is a thirty-two toothed driving wheel 146 carried by a collar 148 secured to shaft 90 by set screw 150 for effecting rotation of turret 16 as will be described subsequently herein.

Operably engageable with wheel 146 is a driving pawl 152 arcuately movable in a bearing race 154 about the offset end 156 of an eccentric shaft 158 and secured thereto by means of a bolt 162 through a washer 160. A hollow cylindrical shaft supporting member 164 for supporting the upper end of control 18 is disposed through an aperture 166 in transverse bar 54 and is secured thereto as by bolts 168. The lower shank 170 of shaft 158 is provided with a bore 172 to receive the upper end 174 of the central shaft 176 of control 18 to which it is secured by a pin 178. An upper bearing race is provided by means of a ledge 180 in member 164 for bearings 182. A collar member 184 is secured to shaft 158 as by a set screw 186 having an upper angled portion 188 adjacent shoulder 190 provides a lower bearing race. As seen in FIG. 7, rotation of control 18 (shaft 176) in one direction (e.g., counterclockwise) will engage the pawl 152 with the teeth of wheel 146 so that further rotation of shaft 176 will rotate the mask holders circularly to positions as desired. Rotation of shaft 176 in the opposite direction (e.g., clockwise) causes the pawl 152 to slip free whereby only the eccentric turns permitting the mask holders to remain in a fixed position.

Figure 3:
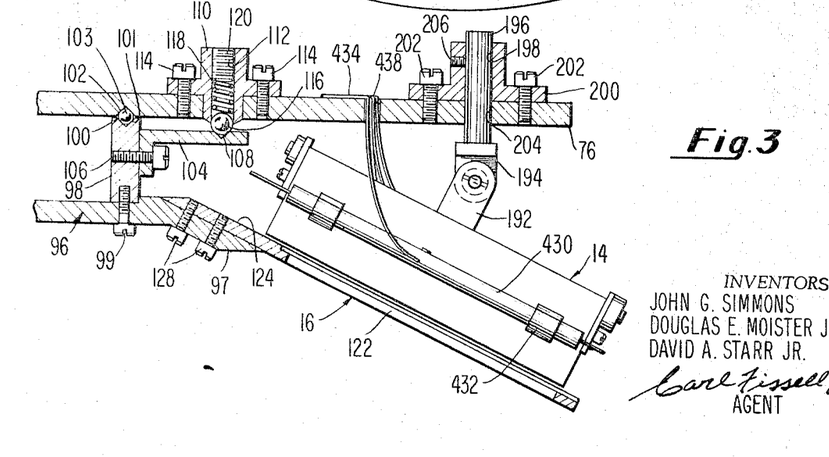
FIG. 3 is a view along the line 3—3 of FIG. 2.

Substrate holder 14, FIG. 3, which will be described in greater detail later on herein, is mounted adjacent and parallel to the mask holder 122 and includes a hanger pivot 192 adjustably secured to the vertically depending end 194 of a stud or pin 196. The latter is slidably mounted in the bore 198 of a block 200 attached to disc 76 by bolts 202 so as to project through an aperture 204 in the disc 76. Pin 196 is adjustably retained in bore 198 by means of a set screw 206.

A Meissner coil 208, for purposes still to be explained surrounds the middle third of the apparatus, intermediate the interior side wall of the bell jar 24 and the operating structure therewithin, and is secured to the vertical legs or shafts 32 in a conventional and well known manner, as by elongated C clamps 210, FIG. 9. Coil 208 is fed into and out of the apparatus by means of inlet and outlet orifices 212 and 214, respectively, through which the ends of the coil pass for interconnection to a source of gas, e.g., nitrogen under suitable pressure. This arrangement is useful in obtaining and maintaining very low pressures.

Figure 10:
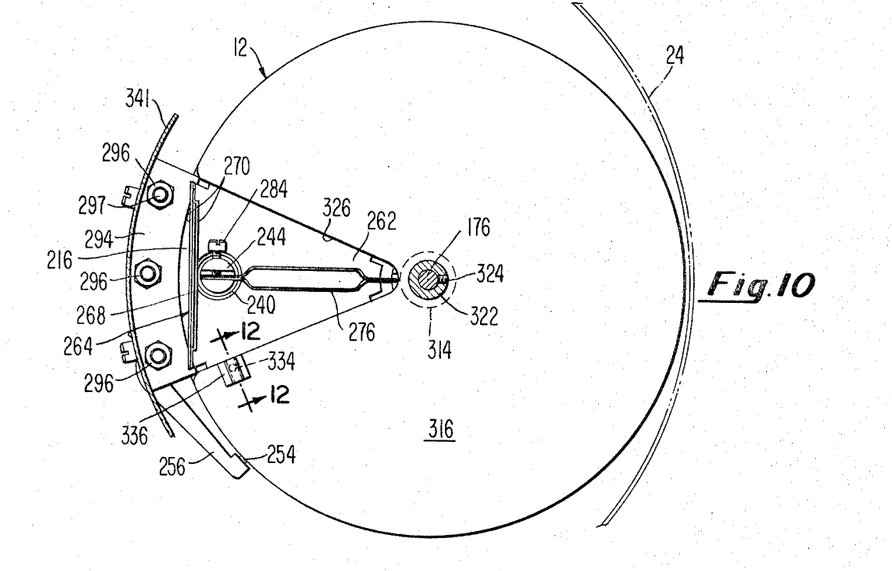
FIG. 10 is a sectional view along the line 10—10 of FIG. 1.
Figure 11:
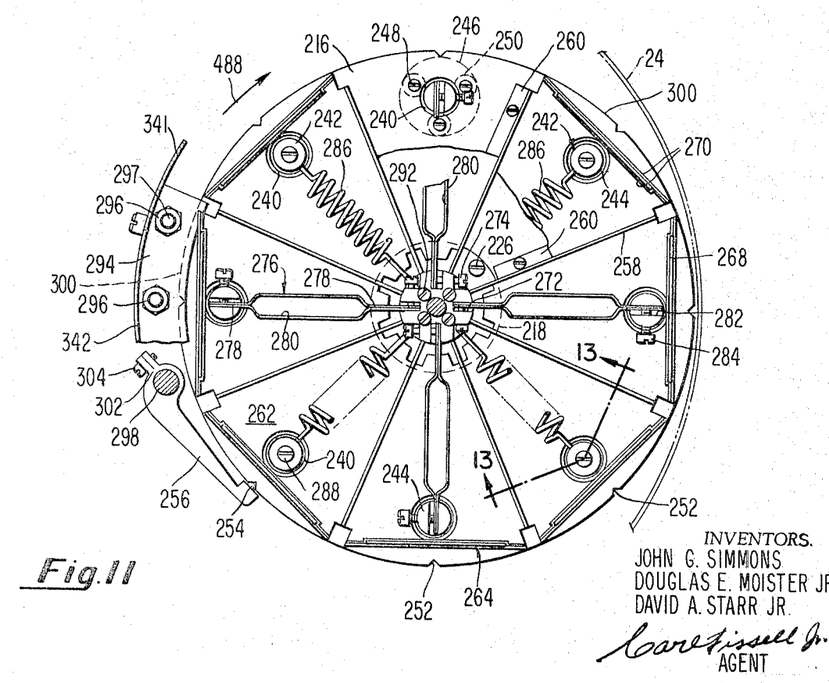
FIG. 11 is a sectional view along the line 11—11 of FIG. 1.

Heater boat turret 12, FIGS. 1, 10 and 11, includes a rigid metallic disc 216, provided with a central aperture 218 through which the lower undercut portion 220, FIG. 1, of an enlarged rigid center post 222 downwardly projects. The peripheral flange 224 of post 222 is secured to disc 216 by bolts 226, which also mount the disc 216 to an upper bearing member 228. A groove 230 in the latter member provides a bearing race operably associated with a lower bearing member 232 having a complementary race forming groove 234 therein. Member 232 is attached by bolts 236 to the base 10. Bearings 238 permit the turret 12 to revolve when otherwise unrestrained, as will be explained hereinafter.

Circularly disposed about the periphery of disc 216 are a plurality of apertures or orifices 240 through which project the elongated shanks 242 of electrical contact members 244. Apertures 240 are oversize relative to shanks 242. The lower portion of each member 244 terminates in a disc-like electrical contact element 246, for purposes to be explained shortly. Bolts 248 provided with individual dielectric bushings 250 e.g., ceramic insulators, three for each contact 244, electrically insulate the contacts from the disc 216. The peripheral edge of the disc 216 includes a plurality of notches 252, FIG. 11, engageable by a spring loaded detent 254 carried by an arcuately pivoted detent arm 256, in a manner to be explained hereinafter.

A plurality of vertically disposed wall forming members 258 are secured to the disc 216 by means of integral bent flanges 260 and are radially arranged like wheel spokes radiating from the center post 222. Wedge shaped drip pans 262, each provided with an upturned transverse portion 264, at the wider end thereof, FIG. 11, are press-fitted between pairs of wall members 258. Each pan includes a downwardly projecting forward tab, not shown, which is received over the bolts 226, FIG. 1, as a means for retaining the pans in the turret assembly. Transparent viewing members 268, e.g., glass microscope slides, FIG. 1, are demountably wedged between the parallel upturned legs 270 of portion 264 of each pan 262.

Center post 222 is provided with a plurality of notches 272, FIG. 11. Each notch includes a horizontally disposed bolt 274 threaded therethrough. One form of conductive boat member 276 is seen to include oppositely disposed end tabs 278 and a central open receptacle portion 280 for receiving the particular material to be evaporated. Certain of the contact members 244, circularly arranged around the disc 216, are provided with a notch 282 extending thereinto from the top and an attachment bolt 284 passing horizontally therethrough. End tabs 278 are received in respective notches 272 and 282 so that bolts 274 and 284 can be tightened to securely suspend each boat, as shown in FIGS. 1–10 and 11.

Another form of material support is seen to comprise a helical member 286 also disposed between the center post 222 and respective alternate contacts 244, one end being secured to each contact by a bolt 288 and a washer 290, with the opposite end of member 286 inserted in a horizontal opening (not shown) in the post 222 whereby a vertically disposed bolt 292 can be tightened down thereupon to securely suspend the helix, as seen in FIG. 11.

Adjacent the periphery of disc 216, to the left in FIGS. 1, 10 and 11, is located an arcuate conductive contact member 294, effective as a tilting stop for disc 216 and simultaneously effective to afford electrical contact to contacts 244, as will be described hereinafter. Member 294 is supported parallel and spaced from base 10 and attached by nuts 296 to the threaded ends 297 of a plurality of vertically disposed standoff posts 298 threaded into the base 10. Contact 294 is thus in circular sliding engagement with the rim portion 300 of disc 216 as seen most clearly to the left in FIG. 11. Detent arm 256, hereinbefore mentioned, is swingably mounted to one of the posts 298 by means of the split end 302 and a bolt 304 extending therethrough.

Referring again to FIG. 1, and to the lower portion thereof, a short length of connecting shaft 306 extends vertically upwardly through the bore 308 of center post 222 so as to project slightly beyond opposite ends thereof. The upper end of shaft 306 includes a fitting 310 threaded thereinto and provided with a shoulder portion 312 on which the hub 314 of a circular flag or cover member 316 is secured as by being press bolted thereto.

The lower end of the upper vertical shaft 176 is undercut to provide a tongue 318 receivable in slot 320 in the upper end of fitting 310. A slidably demountable collar 322 surrounds the lower end of shaft 176 and the fitting 310 and is adapted to be rigidly secured thereto by a set screw 324 so that rotation of lower shaft 306 will concurrently rotate flag 316 and shaft 176 as desired. This arrangement permits the upper turret assembly to be demounted from the lower turret assembly for service, replacement, repair, or adjustment. Flag 316 is provided with a wedge shaped cut out or notch 326, for reasons which will be described herein shortly.

Figure 12:
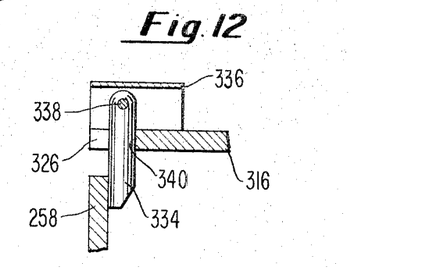
FIG. 12 is a detail sectional view along the line 12—12 of FIG. 10.
Figure 13:
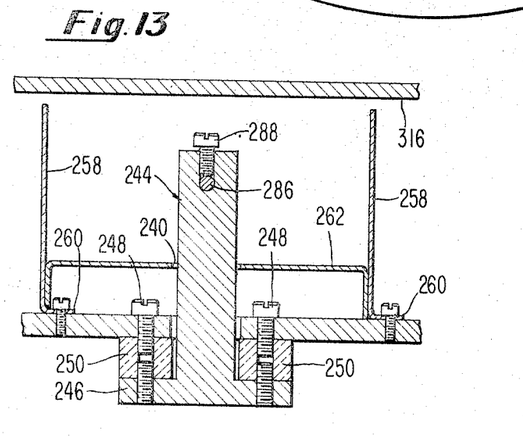
FIG. 13 is a sectional view along the line 13—13 of FIG. 11.

A cone shaped shield or baffle 328, for purposes to be explained hereinafter, is arranged and adjustably positioned with its narrow open end located directly over one of the wedge shaped portions of heater turret 12, as seen in FIG. 9, being supported upon three horizontally disposed posts or arms 330 extending from blocks 332 secured by set screws 333 to the upright posts or legs 32. Adjacent one radial edge of the V or wedge shaped opening 326 in flag 316 is located a detent pawl 334, FIGS. 10 and 12, pivotally mounted within a cover member 336 by means of the pin 338. Pawl 334 depends vertically downwardly past the edge of member 316 into the path of movement of the turret 12. In one direction of rotation of the turret detent 334 is operably wedged between an upstanding wall member 258 and the edge of the radial opening 326 in flag 316, FIG. 12. Rotation of the flag in the opposite direction permits canted lower portion of the detent to lift upwardly and to ratchet idly over the separating wall members 258. Shaft 176 is seen in FIG. 1 to extend vertically through an opening 340 in the cone shaped baffle 328 for engagement with the ratchet drive mechanism as hereinbefore described. An arcuately bent anti-splatter baffle or shield 341 disposed adjacent the outer periphery of the turret 12, is provided with a rectangular aperture or viewing window 342 in juxtaposed relation to the transparent window portions 268 of the turret, for purposes to be described more fully hereinafter.

The lower enlarged end 343 of the shaft 306 is threaded into the vertically projecting shank 344 of the driven portion 346 of magnetic drive assembly 20 and is rotatable therewith, as will now be described. An annular permanent magnet member 348, such for example as a ceramic magnet of conventional construction having a bore 350 therethrough, is received over the reduced lower shank 352 of member 346 and is retained by means of the nut 354 engaged over the threaded end thereof in abutting relationship with the bearing race 356. Bearing race 358 is mounted adjacent race 356 and maintained thereagainst by means of a cylindrical cup-like shroud or cover 360 which completely surrounds and encloses the lower bearing and magnet drive assembly. An annular member 362, secured by bolts 364 within a concentric recess 366 in the upper portion of the shroud 360, operates in conjunction with the shoulder 368 on the driven member 246 to provide an upper bearing race for the assembly. The cover 360 is secured to the base 10 by bolts 370, together with an O-ring 371 effectively sealing the driven magnet assembly from the atmosphere.

An annular permanent magnet 372, similar in material and construction to magnet 348, surrounds the cover 360 and is rotatably supported in driving arrangement (magnetic-coupling) relative to magnet 348 by means of split ring 374, which is rigidly secured to the shroud 360 adjacent magnet 348 by means of bolt 376 through the split end thereof. A driving pulley or belt 378, which may be operated from a hand crank and pulley wheel, not shown, or a suitably controlled e.g. stop-start electric motor, rotates magnet 372. Magnetic lines of force effectively couple the two magnets together causing magnet 348 to be driven in the same direction as magnet 372 in a manner and for purposes to be described hereinafter.

Electrical potential for energizing the heater boats and/or helices of the turret 12, for vapor deposition, is introduced into the present system by means of a solid copper rod 380 adapted to be vertically, reciprocably, slidably movable relative to the base 10, as will now be set forth. Rod 380 is surrounded by a stainless steel pressure pack or jacket 382 terminating at the upper portion thereof in an electrical contact member 384 similar to but somewhat smaller than contact 246, and extending into the vacuum chamber through an aperture 386 in base 10 so as to be axially concentrically arranged, FIG. 1, relative to contacts 246 of turret 12.

The upper portion of electrical connector rod 380 and jacket 382 are surrounded by a metallic bellows 388 effectively sealing the electrical high current input portion of the present apparatus from the atmosphere. The lowermost portion of bellows 388 is received on the upturned flange 390 of member 382. The opposite end of bellows 388 is secured to the downwardly projecting portion 392 of the member 394 and among other things acts as a support for rod 380. The flared portion or flange 393 of member 394 is provided with an annularly disposed row of apertures 396, each one of which carries a dielectric bushing, now shown, such as Teflon. A dielectric washer or gasket 398, of Mylar or similar material, is positioned between the flange 393 and base 10 together with an O-ring 400 after which bolts 402 securely mount the bellows 388 to base 10.

A knurled nut 404 threaded over the lower end 406 of the member 382 abuts an upper circular bellows supporting platen or disc plate 408. A tension spring 410 is disposed intermediate the upper plate 408 and a lower supporting plate 412. A plurality of vertically disposed rods 414 secured at their upper ends in base 10 adjustably support the spring 410 and plates 408 and 412 in spaced apart relation by means of nuts 415, as seen in FIG. 1.

Secured by bolts 416 to the lower surface of base 10 adjacent the arcuate tilt stop member 294 is a member 418, such as a bar of copper or similar conductive material, from which a heavy bus 420 extends for connection into associated electrical power supply circuitry, not shown. Electrical current at suitable amperage levels is fed to the rod 380 by suitable means, not shown, as indicated by the plus (+) sign adjacent the lower end of the rod. The current path is through the two concentric adjacent contacts 384–246, when engaged as hereinafter described, through a contact post 242, through a boat or helix to the center post 22, across the disc 216 to the member 294, through the post 298 back down to the base 10, and out through the bus bar 418 and bus 420 back to the source of potential, e.g., regulated power supply.

Figure 6:
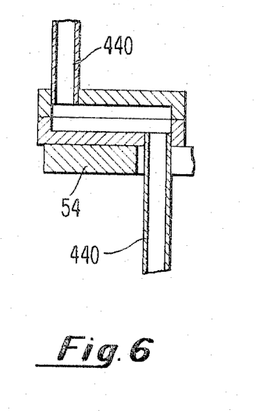
FIG. 6 is a detail sectional view along the line 6—6 of FIG. 4.
Figures 14, 15, 16:
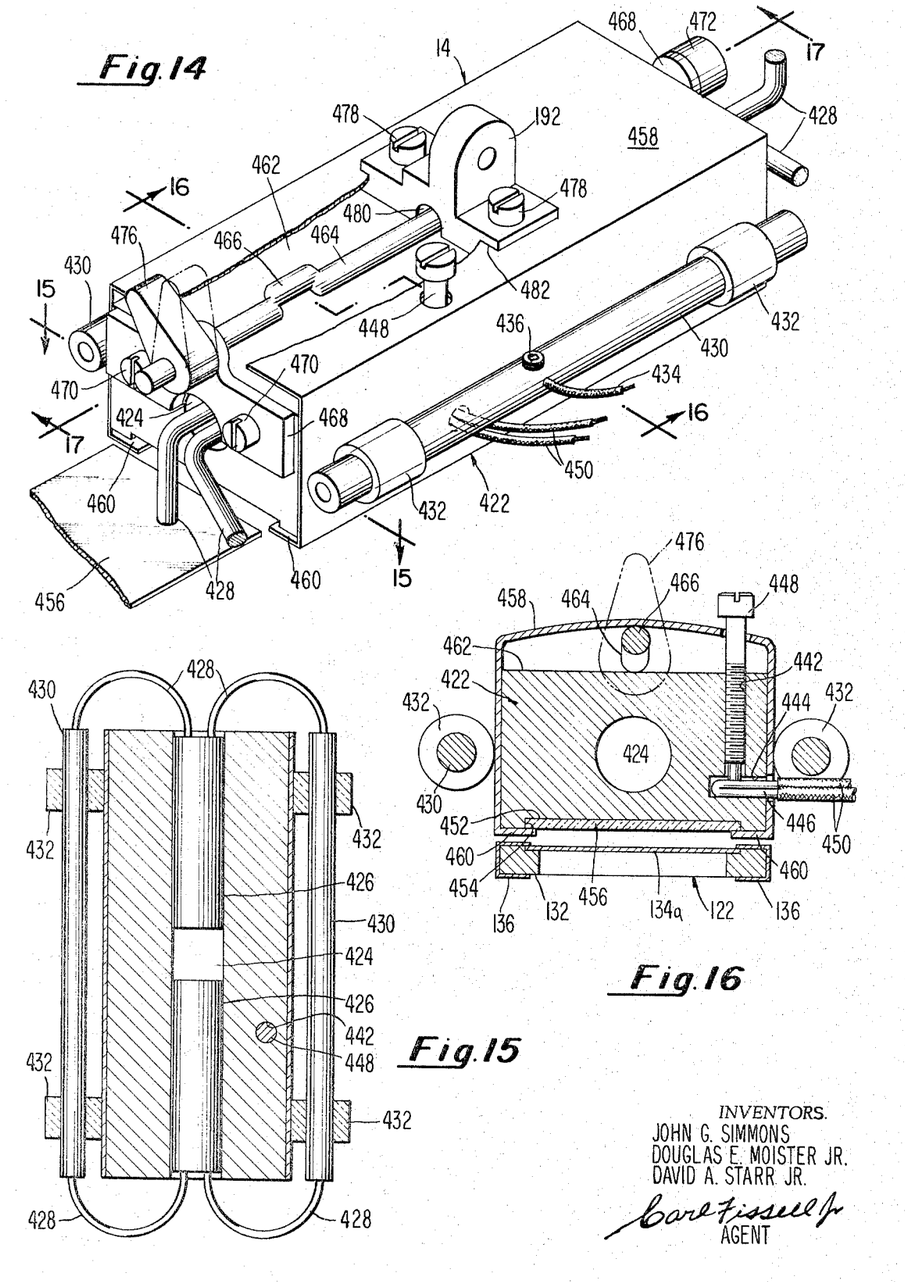
FIG. 14 is an enlarged isometric view of the substrate holder for the present apparatus.
FIG. 15 is a sectional view along the line 15—15 of FIG. 14.
FIG. 16 is a transverse sectional view along the line 16—16 of FIG. 14.
Figure 17:
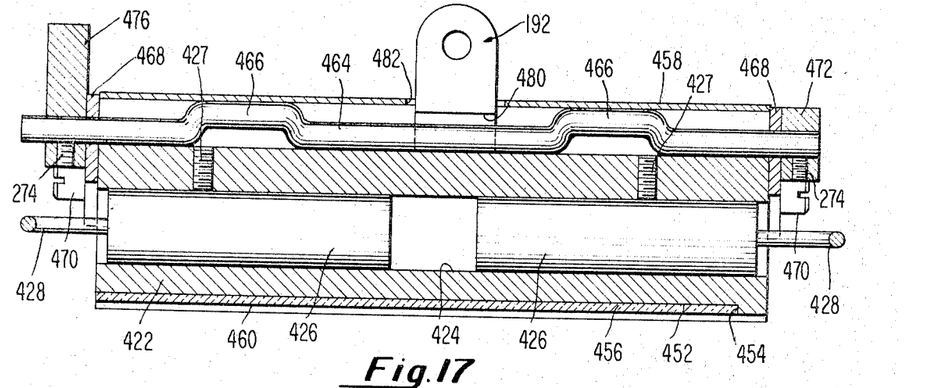
FIG. 17 is a sectional view along the line 17—17 of FIG. 14.

The substrate holder 14, earlier referred to herein, is seen by reference to FIGS. 14 through 17, to comprise a rigid rectangular solid body 422 of conductive material, e.g., stainless steel, which has relatively high resistance to extremes of temperature and as a result will not deform or change shape in either the transverse or longitudinal dimension under extremes of heat or cold. Holder 14 is provided with a central longitudinal bore 424 extending from end to end thereof into which are disposed a pair of heater elements 426—426 in spaced apart relation, as seen in FIG. 15. Conductive leads 428 for the heaters extend away therefrom and are secured to the oppositely disposed parallel solid bus members 430 which are attached to the body of the substrate holder 14 as by brackets 432 in a known manner. Power leads 434 secured to rods 430 by set screws 436 are fed through apertures 438 in plate 76 and into and through the tubes 440, FIG. 6, to an external source of electrical potential. A vertical bore 442 intersecting a horizontal bore 444 provided in the body 422 of the substrate holder, provides means for the introduction into the horizontal portion thereof of a temperature-sensing member 446. In the present preferred embodiment, the temperature senser is a pair of dissimilar metal wires which are secured within the bore 444 by means of the vertically disposed set screw 448 threadedly engageable therein. Leads 450 for the temperature senser are brought out and attached to the turret assembly in a conventional manner.

The lower surface 452 of the substrate holder is provided with an elongated recess, or channel 454, into which a substrate 456, e.g., glass or other similar material, may be slidably received. An enclosure member 458 formed of a single piece of material such as stainless steel is wrapped around the outer peripheral surface of the substrate body 422, FIGS. 14, 16 and 17, with the lower inwardly turned flanged portions 460 thereof overlapping the edges of the channel groove 454 and the edges of the substrate 456 in a manner so as to effectively retain the substrate thereagainst, as will now be described. Secured adjacent the upper surface 462 of the substrate holder body is an irregularly shaped, elongated arcuately rotatable cam member 464 having a pair of oppositely disposed discontinuities or projections 466 thereon. Cam member 464 is rotatable in oppositely disposed bearing blocks 468 which are secured by bolts 470 to opposite ends of the substrate holder. One end of the cam member is provided with retaining collar 472 secured as by a set screw 474 thereto, FIG. 17. The opposite end of cam member 464 is provided with a wedge shaped handle 476 permitting the cam to be arcuately rotatable from the full line to the dotted line position, as seen in FIG. 14. The T-shaped bracket 192 is secured to the holder 14 as by bolts 478. A clearance opening 480 in bracket 192 permits the cam 464 to rotate freely therethrough. Bracket 192 projects upwardly from the member 14 through an aperture 482 in the shroud 458. When the cam is in its retracted position (full line), FIG. 14, the camming projections 466 are to one side, right or left of the central axis of the cam member. When the handle 476 is moved to a vertical position (dotted outline), FIG. 14, the camming projections 466 lift and bow the upper surface of the shroud 458, FIG. 16, causing the lower flange portions 460 thereof to tighten against the edge of the substrate 456 so as to hold the substrate securely within the channel 452 in the lower portion of the substrate holder. By this means the substrate is thus easily inserted and removed from the substrate holder.

The arrangement of the present apparatus is such that with the substrate holders 14 arranged along the four quadrants of a circle, as seen in FIG. 4, and with the mask holder turret arranged to rotate therebeneath, FIG. 1, each substrate may be accurately juxtaposed relative to a desired mask in close proximity thereto, FIG. 16, and without breaking the vacuum or physically handling and contaminating the product by the operator.

Figure 8:
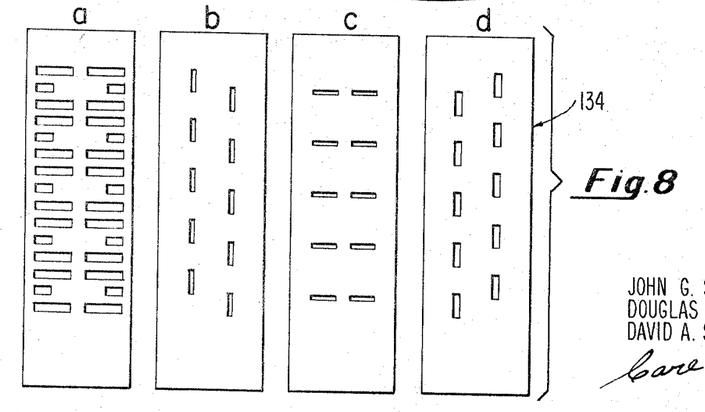
FIG. 8 is a composite view of a plurality of substrate mask for use with this invention.
Figure 18:
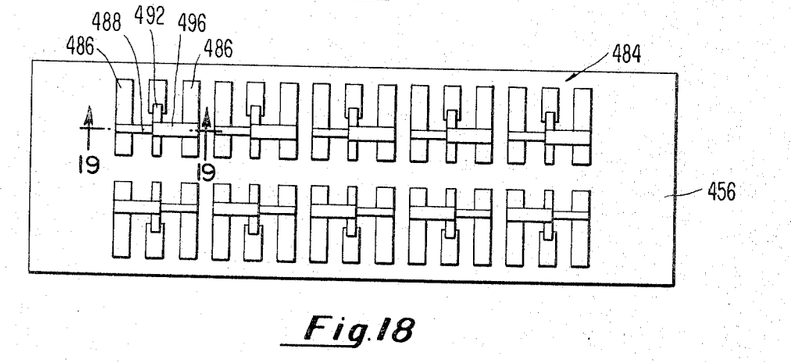
FIG. 18 is an enlarged plan view of an electrical circuit assembly fabricated by means of this apparatus.
Figure 19:
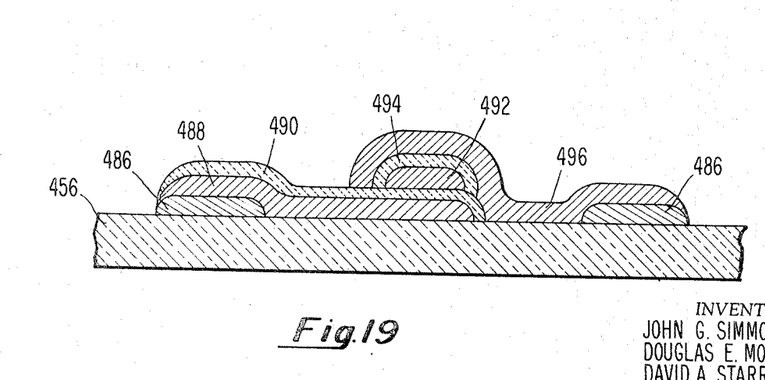
FIG. 19 is an idealized sectional view of a solid state electron device along the line 19—19 of FIG. 18.

One form of end product 484 which may be fabricated by means of the present apparatus is a multi-layer solid state electron device having electrode and bias arrangements similar to transistors and is seen in FIGS. 18 and 19 to include a dielectric substrate 456, e.g., glass or other similar material, which has been evaporatively deposited with a metallic overlay in a desired configuration employing the substrate masks 130a, b, c and d, shown particularly in FIG. 8 of the drawings. It is to be understood that this particular embodiment is only one of many forms of electrical circuit devices which can be provided by means of the present apparatus. Other forms and configurations are easily and simply obtainable by means of other and varying forms of masks.

As seen most clearly in FIG. 19, the circuit configuration therein set forth comprises a substrate 456 on which a solid state electron device such as a thin film triode has been deposited. Oppositely disposed contact metal tabs 486 have been evaporatively formed to provide electrical terminal connections therefor. Over the left-hand metal tab 486 is deposited a metal emitter layer 488 which is then oxidized to provide a metal oxide emitter barrier layer 490. On the rightward end of the emitter barrier 490 a metal base layer 492 is deposited, over which is formed a metal oxide collector barrier layer 494. Finally, over the top of the metal oxide collector barrier layer a collector metal layer 496 is evaporated connecting the emitter to the rightmost contact 486.

Turning now to the operation of the present invention, the apparatus is placed in use by first lowering the feed through stem 380 by suitable means such as a foot pedal (not shown) whereby the contact faces 246–384 are separate slightly as seen in FIG. 2. This operation also permits the turret disc 12 to be indexed. Outer magnet 372 is rotated by hand or otherwise causing the inner magnet 348 and hence the center spindle 306 to rotate. Rotative torque is transmitted to the turret as the pin 334, FIG. 12, engages an upstanding wall 258 of one of the turret separators. The turret is rotatively indexed to bring the selected heater into the desired position before window 342. This type of drive permits the shield 316 and turret 12 to be rotated clockwise, arrow 488, FIG. 11, to desired positions with respect to each other, and more importantly eliminates the use of a dynamic vacuum seal—a constant source of trouble in high-vacuum systems. The only seal in the drive is a static seal between the spindle housing and the base plate 10. The turret boat or boats, i.e., filaments 276 or heaters 286, can be heated with the desired material for evaporation. In addition, the heater containing the material to be evaporated at a given point in the deposition cycle is brought to the center of the vacuum chamber by clockwise rotation of the spindle 306, thus avoiding any angle of incidence problems with the deposited film.

During clockwise rotation of the lower turret 12, the mask holder turret 16, FIG. 4, remains stationary since the driving pawl 152, FIG. 7, has flipped around, arrow 490, FIG. 7, and is idling over the teeth of wheel 146. By rotating magnet 372 in the opposite direction to the foregoing, driving pawl 152 engages and drives the wheel 146 driving the mask holder turret 16 in a counterclockwise direction to bring the desired mask 130 in position beneath the selected substrate. The usual practice in vapor deposition is to shield the substrate 456 from the initial vapor steam which is the dirty part of the deposition technique. With the system hereinbefore described, initial substrate shielding is accomplished by rotating the shield 316 in a counterclockwise direction to a position over the heater, prior to material deposition, i.e., prior to application of potential to the system. Over indexing the lower turret 12 permits the shield or flag 316, FIG. 10, to be moved into position without indexing the upper mask carrying turret.

With the substrate, mask, and material for deposition in position, the contacts 246 and 384 are engaged. When pressure is applied to the contact face 246 of the heater 244 any tendency for the turret to tilt is prevented by means of the stop 294 which contacts the periphery of the turret disc 216, as hereinbefore mentioned. This stop also serves as before mentioned as an electrical contact in the high-current return path. Current is carried away from the system through the base plate 10, thereby eliminating the need for a second high-current feed-through. Currents of 200 amperes, adequate for most practical purposes, have been used for extended periods without pitting or welding of the electrical contact surfaces. Voltages of up to 2 or 3 kv. can be accommodated.

The diaphragm 388 of the high current feed through permits vertical motion of the feed through as well as angular motion so as to compensate for any lack of parallelism between the turret heater post and feed through contact faces. A good pressure (and hence electrical) contact between these two faces is provided by the inherently upward force upon the feed through caused by the pressure difference on either side of the diaphragm. For a two inch diaphragm this force is approximately 50 pounds.

The radial fins 258 on the turret disc partition the heaters 276–286 from each other, and prevent the vapor stream from the incandescent boat from contaminating the other boats and the materials they contain, while the cone shaped baffle directs the vapor stream to the desired mask and substrate. The circular baffle helps to keep the Meissner coil clean. The turret disc shields the base plate 10 from the vapor stream, while the outer fins 264 at the periphery of the turret disc minimize condensation of the deposit onto the bell jar wall. The replaceable glass window 268 in the outer fin permits viewing of the heater when the shield is positioned over it.

Heater current for the system is carried into the vacuum chamber by the high current feed through 380 which is insulated from the base plate 10 by the Mylar ring 398, sandwiched between the O-ring seal 400 and the base plate. The thin walled casing and the diaphragm 388 form a high impedance heat path to the O-ring housing. Thus, most of the heat generated in the feed through during deposition is conducted away through the copper rod 380.

There has thus been described a relatively simple and highly efficient apparatus for producing a substantially uniform straight line deposited metal parallel with the plane of the supporting substrate thereby completely eliminating angle of incidence problems. The apparatus permits the employment of material substrates for a plurality of different film depositions within high vacuum without the necessity of breaking the vacuum during sequented operations. Additionally, although multiple heaters or boats are employed requiring a plurality of electrical contacts, only one electrical feed through into vacuum as required with this system, thus eliminating multiple vacuum seals and the chance for loss of vacuum due to leaks or breaks.

What is claimed is:

1. Vacuum vapor deposition apparatus comprising,
   (a) a vacuum chamber,
   (b) demountable means supporting a plurality of work pieces within said vacuum chamber,
   (c) demountable, movable means supporting a plurality of pattern forming masks adjacent and normal to said work piece supporting means,
   (d) demountable, movable means within said chamber supporting a plurality of materials for vapor deposition on said work pieces,
   (e) means for causing said material to vaporize,
   (f) means for directing vapors from said vaporized material through said pattern forming means onto said work pieces,
   (g) means operably interconnecting said pattern forming means and said material supporting means and responsive to applied torque to cause said last means to move relative to said work pieces, and,
   (h) means external to said vacuum chamber for applying rotative torque to said interconnecting means effective in one direction of rotative torque to effect said applied torque and in the other direction of rotative torque to effect movement of said mask supporting means with respect to both the work support means and the material support means.

2. Apparatus as in claim 1 wherein the work supporting means includes a rigid elongated member disposed within said chamber and operatively associated with means to slidably receive said work pieces, and means to maintain said work support at an elevated temperature.

3. An apparatus as in claim 1 wherein said pattern-mask supporting means includes pivotally mounted, parallel, oppositely disposed, grooved members adapted to operably receive and retain the pattern-mask associated therewith.

4. Apparatus as in claim 1 wherein the work piece supporting means includes a slotted receptacle member for receiving a work piece therein and cam means movable from a position wherein said work piece is retained in operative relationship to said work piece supporting means to a position permitting said work piece to be released and withdrawn from said work piece supporting means.

5. Apparatus as in claim 1 wherein said material support includes a rotatable, horizontally disposed plate having radially arranged, vertically extending wall portions thereon which comprise compartmentizing means dividing the vacuum chamber into a plurality of vertical sectors whereby to accommodate and separate the materials for vapor deposition.

6. Apparatus as in claim 5 wherein said means operably interconnecting include a movable, horizontally disposed, apertured shutter plate responsive to each direction of said applied torque to either permit communication between a set of a evaporant, a mask and a work piece, wherein said set is selected from the aforerecited pluralities of same, or prevent such communication during the initial process stage wherein a desired evaporation rate is effected.

7. Apparatus as in claim 6 including a pin depending from and pivotally fixed to said shutter plate; said pin in vertical position extending below the outer extents of said wall portions; whereby when said shutter plate is subjected to said one direction of applied torque said pin coacts with said wall portions to thereby effect said movement of the material supporting means and with respect to said other direction of rotative torque, the pin is thus adapted to pivot and slide over said wall portions.

References Cited

UNITED STATES PATENTS

| | | | |
|---|---|---|---|
| 2,351,537 | 6/1944 | Osterberg et al. | 118—49 |
| 2,391,595 | 12/1945 | Richards et al. | 118—49 X |
| 2,410,720 | 11/1946 | Dimmick | 118—49 |
| 2,522,272 | 9/1950 | Johnson et al. | 118—49 |
| 2,665,659 | 1/1954 | Ogle | 118—49 |
| 2,745,773 | 5/1956 | Weimer | 118—49 X |
| 2,767,684 | 10/1956 | Weimer et al. | 118—503 |
| 2,792,810 | 5/1957 | Maconeghy et al. | 118—503 |
| 2,799,600 | 7/1957 | Scott | 118—49 X |
| 2,801,607 | 8/1957 | Voder et al. | 118—49.1 |
| 3,023,727 | 3/1962 | Theodoseau et al. | 118—49 X |
| 3,040,702 | 6/1962 | Eng et al. | 118—69 |
| 3,045,642 | 7/1962 | Auzolle et al. | 118—49 |
| 3,097,113 | 7/1963 | Welsh | 118—49 |
| 3,117,025 | 1/1964 | Learn et al. | 118—49 |
| 3,206,322 | 9/1965 | Morgan | 118—49.1 X |
| 3,211,128 | 10/1965 | Potter et al. | 118—49.1 |

MORRIS KAPLAN, *Primary Examiner.*

CHARLES A. WILLMUTH, R. D. NEVIUS, *Examiners.*